Oct. 7, 1924.     C. JOHNSON     1,510,784

PRESSURE GAUGE

Filed Sept. 13, 1923

Charles Johnson.
INVENTOR

BY Victor J. Evans.
ATTORNEY

WITNESS:

Patented Oct. 7, 1924.

1,510,784

UNITED STATES PATENT OFFICE.

CHARLES JOHNSON, OF GROTON, NEW YORK, ASSIGNOR OF ONE-HALF TO CHARLES H. STEARS, OF AUBURN, NEW YORK.

PRESSURE GAUGE.

Application filed September 13, 1923. Serial No. 662,515.

*To all whom it may concern:*

Be it known that I, CHARLES JOHNSON, a citizen of the United States, residing at Groton, in the county of Tompkins and State of New York, have invented new and useful Improvements in Pressure Gauges, of which the following is a specification.

This invention relates to a gauge for motor vehicle tires, the general object of the invention being to provide means whereby air will escape from the gauge as soon as the pressure in the tire reaches the point for which the gauge is set.

Another object of the invention is to provide means for adjusting the gauge so that it can be used for introducing different amounts of air in tires.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
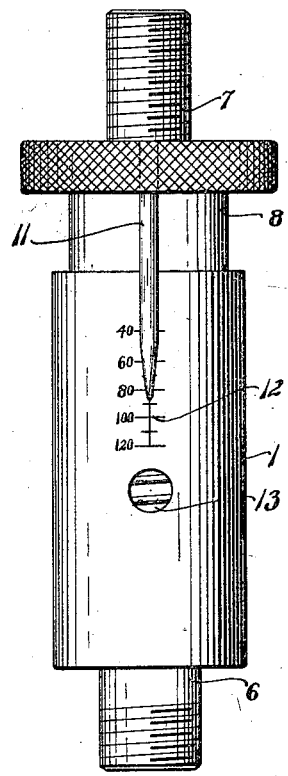
Figure 1 is an elevation of the device.
Figure 2:
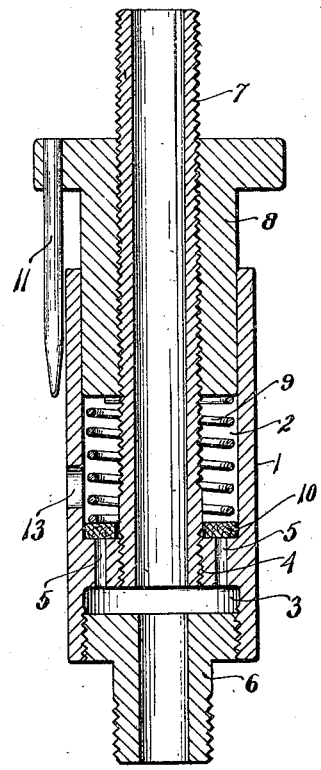
Figure 2 is a longitudinal sectional view.
Figure 3:
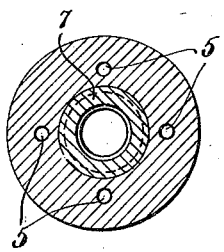
Figure 3 is a cross sectional view through the device.
Figure 4:
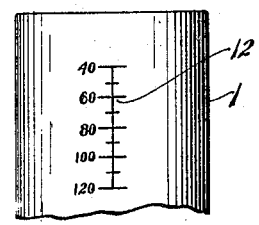
Figure 4 is a view of part of the barrel showing the graduations thereon.

In these views 1 indicates the barrel of the device which is provided with the chambers 2 and 3, the chambers being connected together by the threaded bore 4 and the ports 5. A coupling 6 has its screw threaded head engaging the threads formed on the wall of the chamber 3, said head leaving a space between itself and the bottom of the chamber which is in communication with the ports. A stem 7 passes through the chamber 2 and has its threaded end engaging the threaded bore 4. A tension nut 8 is threaded on the stem and has its cylindrical part extending into the chamber 2 so as to apply tension to a spring 9 which is placed in the chamber and which bears against a fibre washer 10 to press the same upon the bottom of the chamber and thus close the ports 5. The knurled head of the nut 8 carries a pointer 11 which cooperates with the graduations 12 on the body so that the device can be set to "blow off" at any desired pressure. The upper end of the stem is extended above the nut and is threaded to receive the coupling on the air hose.

From the foregoing it will be seen that when the device is attached to the valve stem of a tire by means of the coupling 6 and an air hose connected with the stem 7, air will pass through the stem into the chamber 3, through the coupling into the tire. When the pressure reaches the point for which the spring has been adjusted the air in the chamber 3, passing through the ports 5, will raise the fibre washer, against the action of the spring, until the air port 13 is exposed and thus the air will "blow off" and notify the operator that a sufficient amount of air has been introduced into the tube. By turning the nut 8 to place the pointer on the desired figure on the barrel the device can be made to "blow off" after the proper amount of air has been placed in the tire. With this device it is not necessary to detach the air hose and apply an air gauge in order to find out how much air has been introduced in a tire as the air hose is held in place until the air starts to escape from the port 13.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An air gauge comprising a body having a pair of chambers therein and ports connecting the chambers together, a coupling for connecting the lower chamber with a container, a stem passing through the upper chamber and connected with the lower chamber, the upper end of the stem being fitted to receive an air hose, a valve for controlling the ports, an exhaust port in the body above the valve and spring means for holding the valve on its seat until the air pressure in the container reaches a certain point when the air passing through the ports will lift the valve above the exhaust port and escape therefrom.

2. An air gauge comprising a body having a pair of chambers therein and ports connecting the chambers together, a threaded stem passing through the top chamber and connected with the bottom chamber, a coupling adapted to connect the bottom chamber with a container, a nut on the stem having a portion extending into the upper chamber, a valve in the upper chamber for closing the ports, a spring in the upper chamber between the valve and the nut, said body having an exhaust port located above the valve, a pointer on the nut and graduations on the body and the upper end of the stem being fitted to receive an air hose.

In testimony whereof I affix my signature.

CHARLES JOHNSON.

Witnesses:
   A. A. BYRNE,
   IRVING BARON.